United States Patent
Tanaka et al.

(10) Patent No.: US 10,666,160 B2
(45) Date of Patent: May 26, 2020

(54) POWER CONVERSION DEVICE AND METHOD FOR OPERATING SAME WITH REACTIVE POWER COMPENSATION

(71) Applicant: TOSHIBA MITSUBISHI-ELECTRIC INDUSTRIAL SYSTEMS CORPORATION, Chuo-ku (JP)

(72) Inventors: Tsuguhiro Tanaka, Chuo-ku (JP); Tatsuaki Ambo, Chuo-ku (JP); Masahiro Kinoshita, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 21 days.

(21) Appl. No.: 16/074,098

(22) PCT Filed: Oct. 11, 2016

(86) PCT No.: PCT/JP2016/080110
§ 371 (c)(1),
(2) Date: Jul. 31, 2018

(87) PCT Pub. No.: WO2018/069960
PCT Pub. Date: Apr. 19, 2018

(65) Prior Publication Data
US 2020/0044581 A1 Feb. 6, 2020

(51) Int. Cl.
*H02M 7/515* (2007.01)
(52) U.S. Cl.
CPC .................... *H02M 7/515* (2013.01)
(58) Field of Classification Search
CPC .......... H02M 1/42; H02M 7/48; H02M 7/515; H02M 7/521; H02M 7/53875; Y02B 70/12; Y02B 70/126; Y02E 40/74
(Continued)

(56) References Cited

U.S. PATENT DOCUMENTS

2012/0063179 A1* 3/2012 Gong ...................... H02M 1/12
363/40
2013/0027993 A1* 1/2013 Tan ........................ H02M 7/515
363/40

(Continued)

FOREIGN PATENT DOCUMENTS

| CN | 105720857 A | 6/2016 |
| JP | 2011-193685 | 9/2011 |
| JP | 2016-100960 A | 5/2016 |

OTHER PUBLICATIONS

International Search Report dated Nov. 8, 2016 in PCT/JP2016/080110 filed Oct. 11, 2016.
Office Action dated Dec. 23, 2019, in Chinese Patent Application No. 201680082449.4, w/Partial English Machine Translation.
Office Action dated Jan. 2, 2020, in Indian Patent Application No. 201817028637, (Partial English Translation of First Examination Report).

* cited by examiner

*Primary Examiner* — Alex Torres-Rivera
(74) *Attorney, Agent, or Firm* — Oblon, McClelland, Maier & Neustadt, L.L.P.

(57) ABSTRACT

According to an embodiment of the invention, a power conversion device that includes a power converter, a direct current capacitor, a voltage sensor, a rectifying element, an electromagnetic contactor, and a control circuit is provided. The power converter includes a pair of direct current terminals connected to a direct current power supply, includes multiple alternating current terminals connected to an electric power system of alternating current, converts direct current power input from the direct current power supply into alternating current power, and supplies the alternating current power to the electric power system. The direct current capacitor is connected between the pair of direct current terminals. The voltage sensor detects a voltage value (Continued)

of the direct current capacitor. The rectifying element is provided between the direct current capacitor and the direct current power supply and suppresses a reverse flow of electrical power from the power converter and the direct current capacitor into the direct current power supply. The electromagnetic contactor is connected in parallel with the rectifying element. The control circuit controls operations of the power converter and the electromagnetic contactor. In the case where the voltage value of the direct current capacitor detected by the voltage sensor is a prescribed value or more, the control circuit engages the electromagnetic contactor and supplies active power from the power converter to the electric power system; and in the case where the voltage value of the direct current capacitor detected by the voltage sensor is less than the prescribed value, the control circuit opens the electromagnetic contactor and supplies a reactive power from the power converter to the electric power system.

5 Claims, 5 Drawing Sheets

(58) Field of Classification Search
USPC .................................. 323/205, 207; 363/137
See application file for complete search history.

(56) References Cited

U.S. PATENT DOCUMENTS

| 2016/0233787 A1* | 8/2016 | Matsuoka | ............. | H02J 3/1842 |
| 2018/0034386 A1* | 2/2018 | Okuda | .................. | H02M 3/155 |

POWER CONVERSION DEVICE AND METHOD FOR OPERATING SAME WITH REACTIVE POWER COMPENSATION

FIELD

Embodiments described herein relate generally to a power conversion device and method for operating same.

BACKGROUND ART

There is a power conversion device that converts direct current power input from a direct current power supply such as a solar cell panel or the like into alternating current power and supplies active power to an electric power system of alternating current. For example, such a power conversion device is called a power conditioner. In the power conversion device, a reactive power compensation of the electric power system is performed when the input voltage from the direct current power supply is zero or low. For example, in the case where the direct current power supply is a solar cell panel, the operation of the reactive power compensation is performed in a time period such as night, etc., in which the power generation amount is zero.

If the electrical power of the power conversion device flows back into the direct current power supply side when performing the reactive power compensation, the electrical power is undesirably wasted; and there is a possibility of the undesirable occurrence of negative effects on the direct current power supply. Therefore, it is necessary to suppress the reverse flow of the electrical power into the direct current power supply when performing the reactive power compensation.

For example, there is a configuration that suppresses the reverse flow by cutting off the direct current power supply from the power conversion device by using a low-pressure air circuit breaker (Air Circuit Breaker: ACB), an electromagnetic contactor with an arc chute, etc. However, in the case where an ACB, an electromagnetic contactor with an arc chute, or the like is used, the exterior form of the power conversion device becomes large; and the power conversion device becomes expensive. On the other hand, in the case where a simple electromagnetic contactor is used, part damage may be caused when opening in the state in which the direct current flows; or a decrease of the reliability may be caused by an inrush current flowing in the direct current capacitor when engaging. Also, there is a method of inserting a diode in the direct current input as a method for suppressing the reverse flow; but this increases the wasteful power consumption accompanying the forward voltage drop and reduces the device efficiency. Also, the addition of a cooling mechanism for the loss of the diode, etc., are problematic.

Therefore, in a power conversion device that performs a reactive power compensation and the supply of active power, it is desirable to be able to suppress the reverse flow of the electrical power into the direct current power supply by using a simple and highly-reliable configuration.

PRIOR ART DOCUMENTS

Patent Documents

[Patent Document 1] JP-A 2011-193685 (Kokai)

SUMMARY OF INVENTION

Problem to be Solved by the Invention

An embodiment of the invention provides a power conversion device and a method for operating the power conversion device in which a reverse flow of the electrical power into a direct current power supply can be suppressed using a simple and highly-reliable configuration.

Means for Solving the Problem

According to an embodiment of the invention, a power conversion device that includes a power converter, a direct current capacitor, a voltage sensor, a rectifying element, an electromagnetic contactor, and a control circuit is provided. The power converter includes a pair of direct current terminals connected to a direct current power supply, includes multiple alternating current terminals connected to an electric power system of alternating current, converts direct current power input from the direct current power supply into alternating current power, and supplies the alternating current power to the electric power system. The direct current capacitor is connected between the pair of direct current terminals. The voltage sensor detects a voltage value of the direct current capacitor. The rectifying element is provided between the direct current capacitor and the direct current power supply and suppresses a reverse flow of electrical power from the power converter and the direct current capacitor into the direct current power supply. The electromagnetic contactor is connected in parallel with the rectifying element. The control circuit controls operations of the power converter and the electromagnetic contactor. In the case where the voltage value of the direct current capacitor detected by the voltage sensor is a prescribed value or more, the control circuit engages the electromagnetic contactor and supplies active power from the power converter to the electric power system; and in the case where the voltage value of the direct current capacitor detected by the voltage sensor is less than the prescribed value, the control circuit opens the electromagnetic contactor and supplies a reactive power from the power converter to the electric power system.

Effects of the Invention

According to embodiments of the invention, a power conversion device and a method for operating the power conversion device are provided in which a direct current power supply can be cut off by using a simple and highly-reliable configuration while maintaining the efficiency of the normal operation.

DESCRIPTION OF EMBODIMENTS

Figure 1:
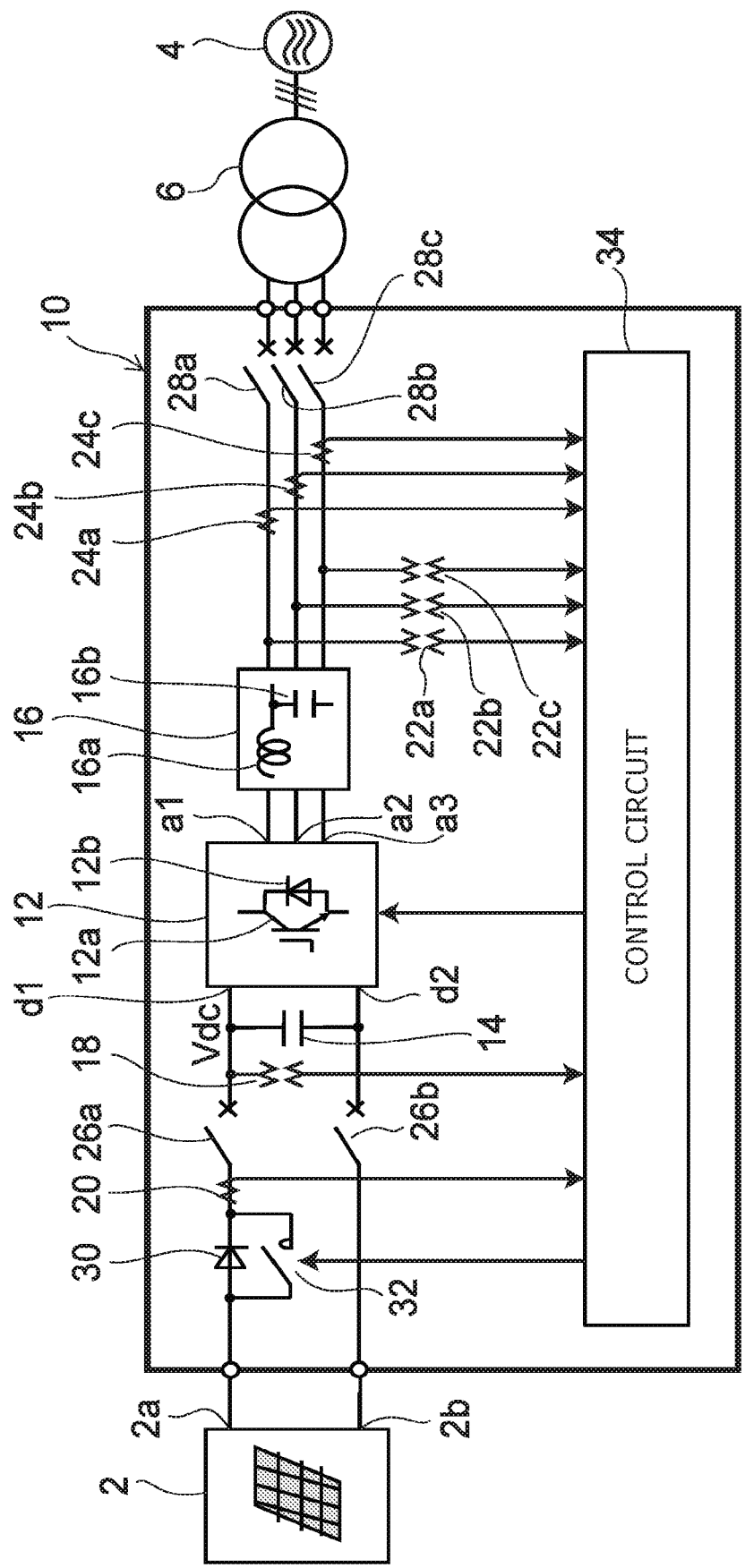
FIG. 1 is a block diagram schematically illustrating a power conversion device according to an embodiment.

Various embodiments will be described hereinafter with reference to the accompanying drawings.

The drawings are schematic or conceptual. The relationship between the thickness and the width of each portion, and the size ratio between the portions, for instance, are not necessarily identical to those in reality. Furthermore, the same portion may be shown with different dimensions or ratios depending on the figures.

In the present specification and the drawings, components similar to those described previously with reference to earlier figures are labeled with like reference numerals, and the detailed description thereof is omitted appropriately.

FIG. 1 is a block diagram schematically illustrating a power conversion device according to an embodiment.

As illustrated in FIG. 1, the power conversion device 10 includes a power converter 12, a direct current capacitor 14, a filter circuit 16, a voltage sensor 18, a current sensor 20, voltage sensors 22a to 22c, current sensors 24a to 24c, switches 26a, 26b, and 28a to 28c, a diode 30 (a rectifying element), an electromagnetic contactor 32, and a control circuit 34.

The power conversion device 10 is connected to a solar cell panel 2 as a direct current power supply and to an electric power system 4 of alternating current. For example, the power conversion device 10 is connected to the electric power system 4 via a transformer 6. The solar cell panel 2 supplies direct current power to the power conversion device 10. The power conversion device 10 converts the direct current power input from the solar cell panel 2 into alternating current power and supplies the alternating current power after the conversion to the electric power system 4.

The power conversion device 10 supplies active power and some reactive power to the electric power system 4. For example, the power conversion device 10 causes the solar cell panel 2 to function as a distributed power source. Also, by supplying the reactive power to the electric power system 4, the power conversion device 10 performs a reactive power compensation of suppressing the voltage fluctuation of the electric power system 4. For example, in a time period such as during the day or the like when the power generation amount of the solar cell panel 2 is high, the power conversion device 10 performs an operation of supplying the active power and some reactive power. Also, for example, in a time period such as night or the like when the power generation amount of the solar cell panel 2 is low, the power conversion device 10 performs an operation of supplying the reactive power.

Thus, the power conversion device 10 has a normal operation mode of supplying the active power and some reactive power to the electric power system 4, and a SVC (Static Var Compensator) operation mode of supplying the reactive power to the electric power system 4.

In the example, the solar cell panel 2 is shown as the direct current power supply. The direct current power supply is not limited to the solar cell panel 2 and may be any power supply capable of supplying direct current power. In the example, the alternating current power of the electric power system 4 is three-phase alternating current power. The power conversion device 10 converts the direct current power into the three-phase alternating current power and supplies the three-phase alternating current power to the electric power system 4. The alternating current power of the electric power system 4 is not limited to three-phase alternating current power and may be single-phase alternating current power, etc. The alternating current voltage of the electric power system 4 is, for example, 100 V (the effective value). The frequency of the alternating current power of the electric power system 4 is, for example, 50 Hz or 60 Hz.

The power converter 12 includes a pair of direct current terminals d1 and d2 that is connected to the solar cell panel 2, and multiple alternating current terminals a1 to a3 that are connected to the electric power system 4. The direct current terminal d1 is a direct current terminal on the high-voltage side; and the direct current terminal d2 is a direct current terminal on the low-voltage side. Conversely, the direct current terminal d1 may be on the low-voltage side; and the direct current terminal d2 may be on the high-voltage side.

In the example, the power converter 12 includes the three alternating current terminals a1 to a3 corresponding to each phase of the three-phase alternating current power. For example, in the case where the alternating current power of the electric power system 4 is single-phase alternating current power, the number of alternating current terminals may be two. It is sufficient to appropriately set the number of alternating current terminals according to the form of the alternating current power, etc.

The power converter 12 converts the direct current power of the solar cell panel 2 into alternating current power corresponding to the electric power system 4 and supplies the alternating current power to the electric power system 4. The power converter 12 includes, for example, multiple switching elements 12a, and multiple rectifying elements 12b that are connected in anti-parallel respectively with the switching elements 12a. The power converter 12 converts the direct current power into the alternating current power by the ON/OFF of each of the switching elements 12a. The power converter 12 is a so-called inverter.

The power converter 12 includes, for example, six switching elements 12a having a three-phase bridge connection and converts the direct current power into the three-phase alternating current power by the ON/OFF of each of the switching elements 12a. For example, self arc-extinguishing type semiconductor elements such as GTOs (Gate Turn-Off thyristors), IGBTs (Insulated Gate Bipolar Transistors), etc., are used as the switching elements 12a.

The direct current capacitor 14 is connected between the pair of direct current terminals d1 and d2. For example, the direct current capacitor 14 smoothes the direct current voltage of the solar cell panel 2. In other words, the direct current capacitor 14 is a smoothing capacitor.

The filter circuit 16 is provided between the electric power system 4 and each of the alternating current terminals a1 to a3. The filter circuit 16 is connected to each of the alternating current terminals a1 to a3. The filter circuit 16 includes, for example, an inductor 16a and a condenser 16b. For example, the inductor 16a and the condenser 16b are provided for each phase of the alternating current power. The filter circuit 16 suppresses the harmonic components of the alternating current power output from the power converter 12 and causes the output waveform to approach a sine wave.

The voltage sensor 18 is connected between the direct current terminal d1 on the high-voltage side and the direct current terminal d2 on the low-voltage side. The voltage sensor 18 detects a voltage value Vdc of the direct current capacitor 14. In other words, the voltage sensor 18 detects the voltage value of the direct current voltage of the solar cell panel 2. Also, the voltage sensor 18 is connected to the control circuit 34 and inputs the detected voltage value Vdc to the control circuit 34.

The current sensor 20 is provided between the solar cell panel 2 and the power converter 12. The current sensor 20 detects the current value of the direct current input to the power converter 12. The current sensor 20 is connected to the control circuit 34 and inputs the detected current value to the control circuit 34.

The voltage sensors 22a to 22c are connected respectively to the alternating current terminals a1 to a3 via the filter circuit 16. The voltage sensors 22a to 22c detect the voltage value of the alternating current power output from the power converter 12. In other words, the voltage sensors 22a to 22c detect the voltage value of the alternating current voltage of the electric power system 4. For example, the voltage sensors 22a to 22c respectively detect the voltage value (the phase voltage) of each phase of the three-phase alternating current power. The voltage sensors 22a to 22c are connected to the control circuit 34 and input the detected voltage values to the control circuit 34.

The current sensors 24a to 24c each are provided between the filter circuit 16 and the electric power system 4. The current sensors 24a to 24c detect the current value of the alternating current power output from the power converter 12. In other words, the current sensors 24a to 24c detect the current value of the alternating current of the electric power system 4. The current sensors 24a to 24c detect the current value (the phase current) of each phase of the three-phase alternating current power. The current sensors 24a to 24c are connected to the control circuit 34 and input the detected current values to the control circuit 34.

The switches 26a and 26b are provided between the solar cell panel 2 and the power converter 12. The switches 28a to 28c are provided between the electric power system 4 and the power converter 12. For example, the switches 26a and 26b are manual, normally are in the engaged state, and are automatically opened by an operation of the control circuit 14 when some abnormality occurs, etc. Also, in the case where the voltage values detected by the voltage sensors 22a to 22b and the terminal voltages on the power conversion device side of the transformer 6 from not-illustrated voltage sensors are considered to be equal within a prescribed range, for example, the switches 28a to 28c are engaged automatically by the operation of the control circuit 14. For example, the switches 26a, 26b, and 28a to 28c are opened to cut off the power converter 12 from the solar cell panel 2 and the electric power system 4 during maintenance, etc. The power converter 12 is connected to the solar cell panel 2 and the electric power system 4 by engaging the switches 26a, 26b, and 28a to 28c.

The diode 30 is provided between the direct current capacitor 14 and the solar cell panel 2. The anode of the diode 30 is connected to an output terminal 2a on the high-voltage side of the solar cell panel 2. The cathode of the diode 30 is connected to the direct current terminal d1 on the high-voltage side of the power converter 12 via the switch 26a. Thereby, the diode 30 suppresses the reverse flow of the electrical power from the power converter 12 and the direct current capacitor 14 into the solar cell panel 2. The diode 30 may be provided between an output terminal 2b on the low-voltage side of the solar cell panel 2 and the direct current terminal d2 on the low-voltage side of the power converter 12.

The electromagnetic contactor 32 is connected in parallel with the diode 30. In the case where the electromagnetic contactor 32 is open, the solar cell panel 2 and the power converter 12 are connected via the diode 30; and the reverse flow of the electrical power is suppressed. On the other hand, in the case where the electromagnetic contactor 32 is engaged, the solar cell panel 2 and the power converter 12 are connected via the electromagnetic contactor 32. In the case where the electromagnetic contactor 32 is engaged, the solar cell panel 2 and the power converter 12 are substantially electrically connected. In the case where the electromagnetic contactor is engaged, the current that flows in the diode 30 disappears; and a current flows in the electromagnetic contactor 32.

The control circuit 34 controls the operations of the power converter 12 and the electromagnetic contactor 32. The control circuit 34 controls the conversion of the electrical power by the power converter 12. Also, the control circuit 34 controls the switching of the engage/open of the electromagnetic contactor 32. For example, the control circuit 34 is connected to the gate signal terminals of the switching elements 12a. By controlling the ON/OFF of each of the switching elements 12a, the control circuit 34 controls the conversion of the electrical power by the power converter 12.

The control circuit 34 includes the operation of the normal operation mode and the operation of the SVC operation mode. In the normal operation mode, for example, the control circuit 34 controls the ON/OFF of each of the switching elements 12a of the power converter 12 to perform the conversion into alternating current power synchronized with the alternating current power of the electric power system 4. For example, based on the detection results of the voltage sensors 22a to 22c and the current sensors 24a to 24c, the control circuit 34 detects the voltage, the frequency, the phase, etc., of the alternating current power of the electric power system 4 and causes the voltage, the frequency, the phase, etc., of the alternating current power converted by the power converter 12 to match the alternating current power of the electric power system 4. Thereby, the alternating current power that is converted by the power converter 12 is output to the electric power system 4 as the active power.

Also, in the case of the normal operation mode, for example, the control circuit 34 performs a control of an MPPT (Maximum Power Point Tracking) method to cause the direct current power to track the maximum power point of the solar cell panel 2. For example, based on the voltage value Vdc of the direct current capacitor 14 detected by the voltage sensor 18 and the current value of the direct current detected by the current sensor 20, the control circuit 34 extracts the maximum power point (the optimal operating point) of the solar cell panel and controls the operation of the power converter 12 according to the extracted maximum power point.

On the other hand, in the case of the SVC operation mode, for example, based on the detection results of the voltage sensors 22a to 22c and the current sensors 24a to 24c, the control circuit 34 determines the reactive power that the power converter 12 outputs to the electric power system 4. Then, the control circuit 34 controls the ON/OFF of each of the switching elements 12a of the power converter 12 according to the determined reactive power. Thereby, the alternating current power that is converted by the power converter 12 is output to the electric power system 4 as the reactive power. Thereby, for example, the reactive power of the electric power system 4 can be controlled. For example, the stability of the electric power system 4 can be increased.

In the SVC operation mode, the direct current voltage of the direct current capacitor 14 is converted into an alternating current voltage by the power converter 12. Also, in the SVC operation mode, the direct current capacitor 14 is charged from the electric power system 4 side by the ON/OFF of each of the switching elements 12a of the power converter 12. In the case of the SVC operation mode, the control circuit 34 controls the ON/OFF of each of the switching elements 12a of the power converter 12 so that the voltage value of the direct current capacitor 14 is substantially constant at a prescribed value. Further, in the SVC operation mode, the control circuit 34 controls the active power so that a control is performed in the direction of the supply of the active power from the electric power system 4 to the direct current capacitor 14 to maintain the direct current capacitor voltage; but a control is not performed in the direction of the supply of the active power from the direct current capacitor 14 to the electric power system 4.

Figure 2:
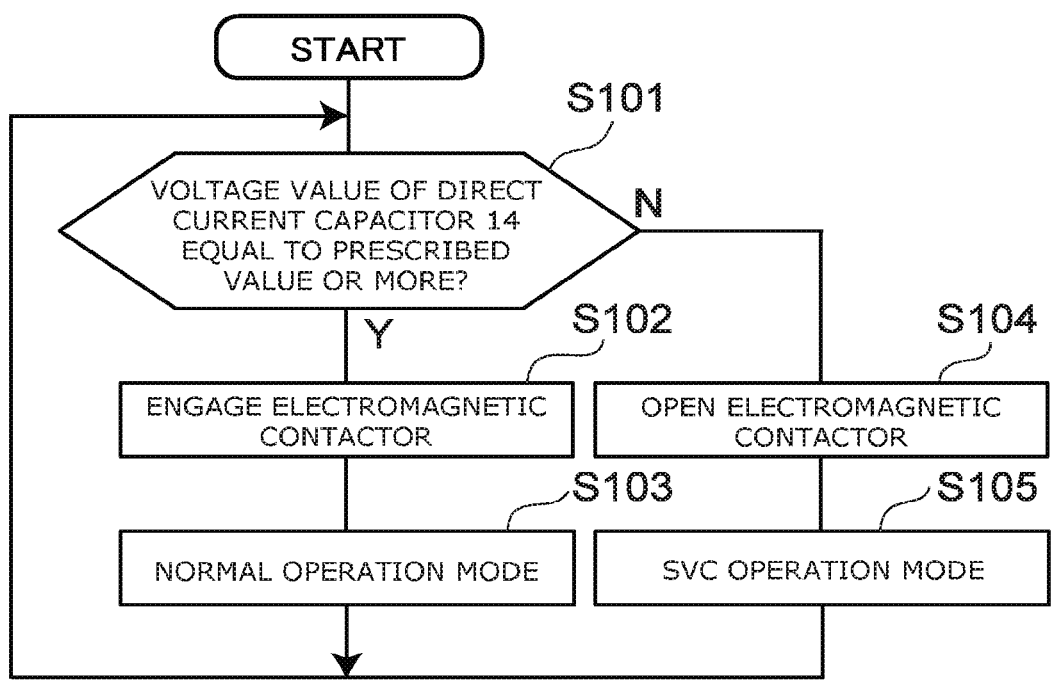
FIG. 2 is a flowchart schematically illustrating the operation of the power conversion device according to the embodiment.

FIG. 2 is a flowchart schematically illustrating the operation of the power conversion device according to the embodiment.

As illustrated in FIG. 2, the control circuit 34 of the power conversion device 10 determines whether or not the voltage value Vdc of the direct current capacitor 14 detected by the voltage sensor 18 is a prescribed value or more (step S101 of FIG. 2).

In the case where the control circuit 34 determines that the voltage value Vdc of the direct current capacitor 14 is the prescribed value or more, the control circuit 34 engages the electromagnetic contactor 32 (step S102 of FIG. 2).

Subsequently, the control circuit 34 controls the operation of the power converter 12 in the normal operation mode (step S103 of FIG. 2). In other words, the control circuit 34 supplies the active power and some reactive power from the power converter 12 to the electric power system 4. At this time, the increase of the wasteful power consumption accompanying the forward voltage drop of the diode 30 can be suppressed by engaging the electromagnetic contactor 32. The current that flows in the diode 30 can be suppressed; and the decrease of the device efficiency can be suppressed. For example, in a configuration in which a large current is constantly caused to flow in the diode 30, there is a risk of heat generation of the diode 30. By engaging the electromagnetic contactor 32 in the normal operation mode, a cooling mechanism for suppressing such heat of the diode 30, etc., also can be omitted.

On the other hand, in the case where the control circuit 34 determines that the voltage value Vdc of the direct current capacitor 14 is less than the prescribed value, the control circuit 34 opens the electromagnetic contactor 32 (step S104 of FIG. 2).

After the electromagnetic contactor 32 is opened, the control circuit 34 controls the operation of the power converter 12 in the SVC operation mode (step S105 of FIG. 2). Namely, the control circuit 34 supplies the reactive power from the power converter 12 to the electric power system 4. At this time, the reverse flow of the electrical power from the power converter 12 and the direct current capacitor 14 into the solar cell panel 2 can be suppressed by opening the electromagnetic contactor 32 and connecting the solar cell panel 2 and the power converter 12 via the diode 30. Also, in the SVC operation mode, the control circuit 34 compensates the voltage drop of the direct current capacitor 14 due to the occurrence of the loss accompanying the operation of the power converter 12 and introduces some active power for maintaining a prescribed voltage from the electric power system 4 to the power converter 12. However, in the SVC operation mode, a control is performed so that the active power from the power converter 12 is not supplied to the electric power system 4.

Thus, in the power conversion device 10 according to the embodiment, even in the case where the reactive power compensation and the supply of the active power are performed, the reverse flow of the electrical power into the solar cell panel 2 can be suppressed. Also, in the power conversion device 10, the suppression of the reverse flow of the electrical power is performed by the diode 30 and the electromagnetic contactor 32. Thereby, the apparatus configuration can be simple compared to the case where an ACB, an electromagnetic contactor with an arc chute, or the like is used.

Further, in the power conversion device 10, the electromagnetic contactor 32 is engaged when the voltage value Vdc of the direct current capacitor 14 is the prescribed value or more. The current that flows when the electromagnetic contactor 32 is engaged is a charging current to the direct current capacitor 14 corresponding to only the forward voltage drop amount of the diode 30; and the current value is small. In the power conversion device 10, the occurrence of the inrush current can be suppressed; and high reliability can be obtained. Also, it is unnecessary to provide an initial charging circuit of the direct current capacitor 14, etc. For example, even when the magnetic excitation of the electromagnetic contactor 32 is cutoff due to a power interruption, a fault, etc., the flow is switched to the diode 30 side which leads to protection because overcurrent cut-off does not occur in the electromagnetic contactor 32. Accordingly, in the power conversion device 10 according to the embodiment, the reverse flow of the electrical power into the solar cell panel 2 can be suppressed by using a simple and highly-reliable configuration.

Figure 3:
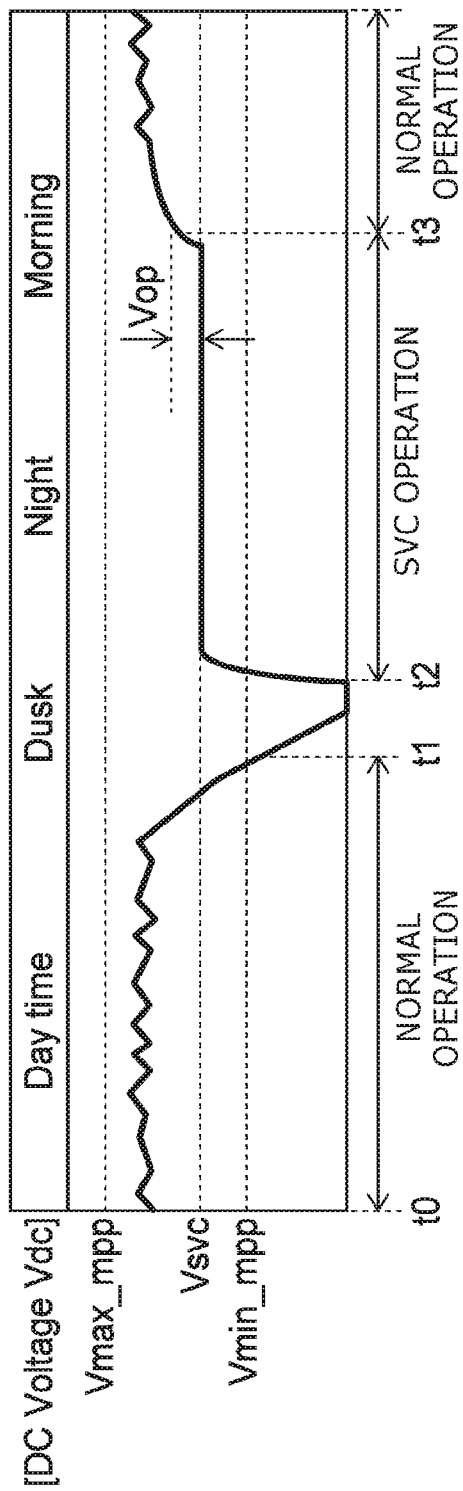
FIG. 3 is a graph schematically illustrating a specific example of the operation of the power conversion device according to the embodiment.

FIG. 3 is a graph schematically illustrating a specific example of the operation of the power conversion device according to the embodiment.

Figure 4:
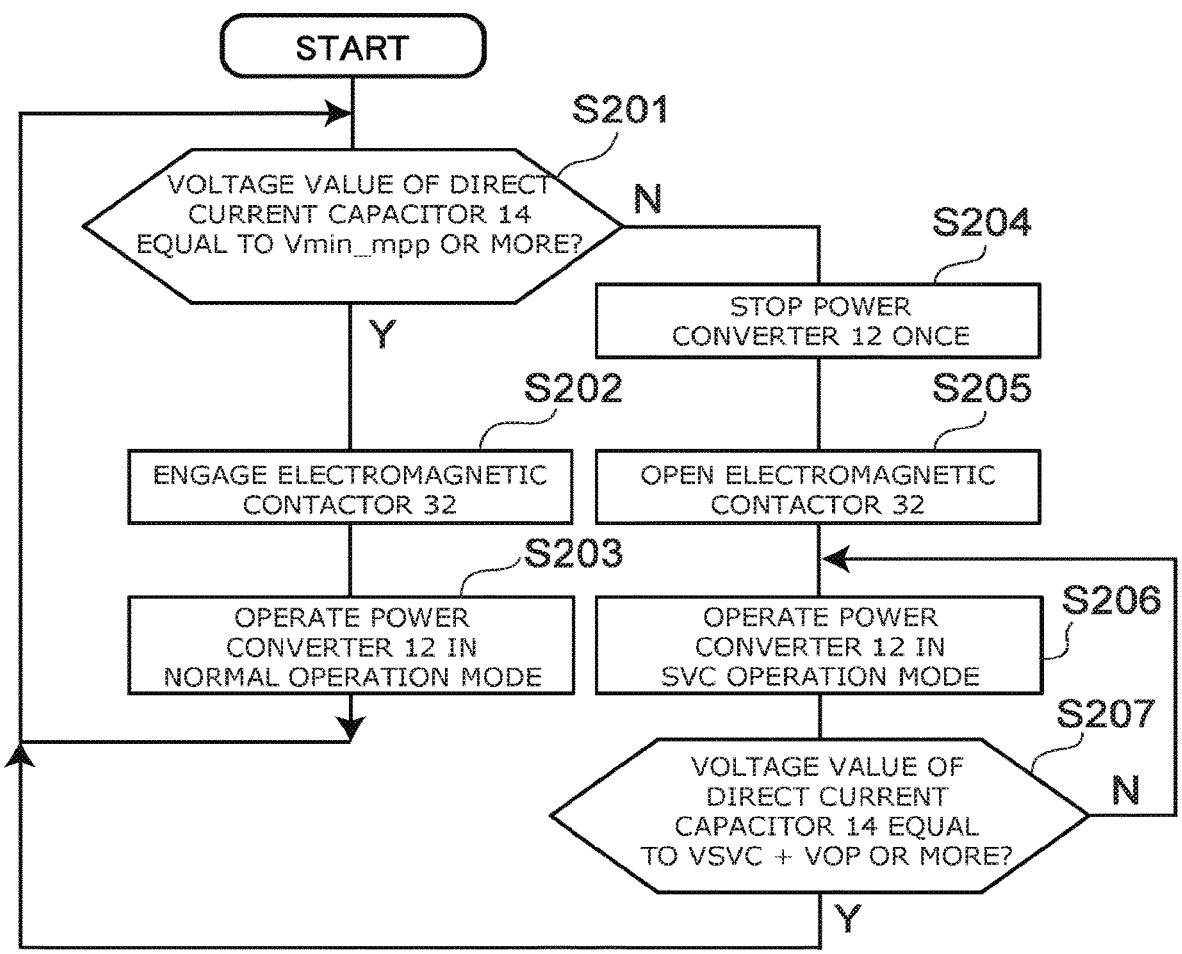
FIG. 4 is a flowchart schematically illustrating the specific example of the operation of the power conversion device according to the embodiment.

FIG. 4 is a flowchart schematically illustrating the specific example of the operation of the power conversion device according to the embodiment.

The horizontal axis of FIG. 3 is the time; and the vertical axis is the voltage value Vdc of the direct current capacitor 14 detected by the voltage sensor 18.

As illustrated in FIG. 3 and FIG. 4, for example, the control circuit 34 of the power conversion device 10 controls the power converter 12 in the normal operation mode when the power generation amount of the solar cell panel 2 is high during the day. More specifically, in the case where the voltage value Vdc is within the operation range of the MPPT control between an upper limit voltage Vmax_mpp and a lower limit voltage Vmin_mpp (Vmin_mpp<Vdc<Vmax_mpp), the control circuit 34 controls the power converter 12 in the normal operation mode (time t0 to t1 of FIG. 3 and steps S201 to S203 of FIG. 4). At this time, the decrease of the device efficiency can be suppressed by engaging the electromagnetic contactor 32.

In the normal operation mode, in the case where the voltage value Vdc becomes less than the lower limit voltage Vmin_mpp which is a first determination value, the control circuit 34 determines that it is sunset and stops the operation of the power converter 12 once (the time t1 of FIG. 3 and steps S201 and S204 of FIG. 4). After stopping the operation of the power converter 12, the control circuit 34 opens the electromagnetic contactor 32 (step S205 of FIG. 4). Subsequently, the control circuit 34 starts the control of the power converter 12 by the SVC operation mode (a time t2 of FIG. 3 and steps S206 and S207 of FIG. 4). At this time, the reverse flow of the electrical power into the solar cell panel 2 is suppressed by continuing the open state of the electromagnetic contactor 32.

In the SVC operation mode, the control circuit 34 controls the operation of the power converter 12 so that the voltage value Vdc of the direct current capacitor 14 is substantially constant at a prescribed voltage VSVC. For example, the prescribed voltage VSVC is set between the upper limit voltage Vmax_mpp and the lower limit voltage Vmin_mpp of the MPPT control. Also, in the SVC operation mode, the control circuit 34 compensates the voltage drop of the direct current capacitor 14 due to the occurrence of the loss accompanying the operation of the power converter 12 and introduces some active power from the electric power system 4 to the power converter 12 to maintain a prescribed voltage VSVC. However, in the SVC operation mode, the control is performed so that the active power is not supplied from the power converter 12 to the electric power system 4.

For example, in the case where the voltage of the solar cell panel 2 increases at sunrise and becomes a second determination value (VSVC+VOP) or more, the control circuit 34 determines that it is sunrise (a time t3 of FIG. 3 and step S207 of FIG. 4). In other words, in the SVC operation mode, a control is performed so that the active power is not supplied from the power converter 12 to the electric power system 4; therefore, in the case where the supply power from the solar cell panel 2 becomes larger than the loss occurring in the conversion device 10, the direct current capacitor 14 is charged by the excess electrical power; and the voltage value Vdc of the direct current capacitor 14 increases.

For example, the second determination value (VSVC+VOP) is set between the prescribed voltage VSVC and the upper limit voltage Vmax_mpp. In the case where it is determined to be sunrise, the control circuit 34 engages the electromagnetic contactor 32 and starts the control of the power converter 12 by the normal operation mode (steps S201 to S203 of FIG. 4). After determining it to be sunrise, the operation of the power converter 12 may be stopped once; and the control of the normal operation mode may be started after engaging the electromagnetic contactor 32.

Thus, when performing the supply of the active power in the normal operation mode, in the case where the voltage value Vdc becomes less than the first determination value (in the example, the lower limit voltage Vmin_mpp), the control circuit 34 opens the electromagnetic contactor 32 and starts the operation of the supply of the reactive power by the SVC operation mode. Then, when performing the supply of the reactive power in the SVC operation mode, in the case where the voltage value Vdc becomes at least the second determination value (in the example, the determination value (VSVC+VOP)) that is higher than the first determination value, the control circuit 34 engages the electromagnetic contactor 32 and starts the operation of the supply of the active power by the normal operation mode. Thereby, for example, the undesirable frequent switching between the normal operation mode and the SVC operation mode by the control circuit 34 can be suppressed.

Figure 5:
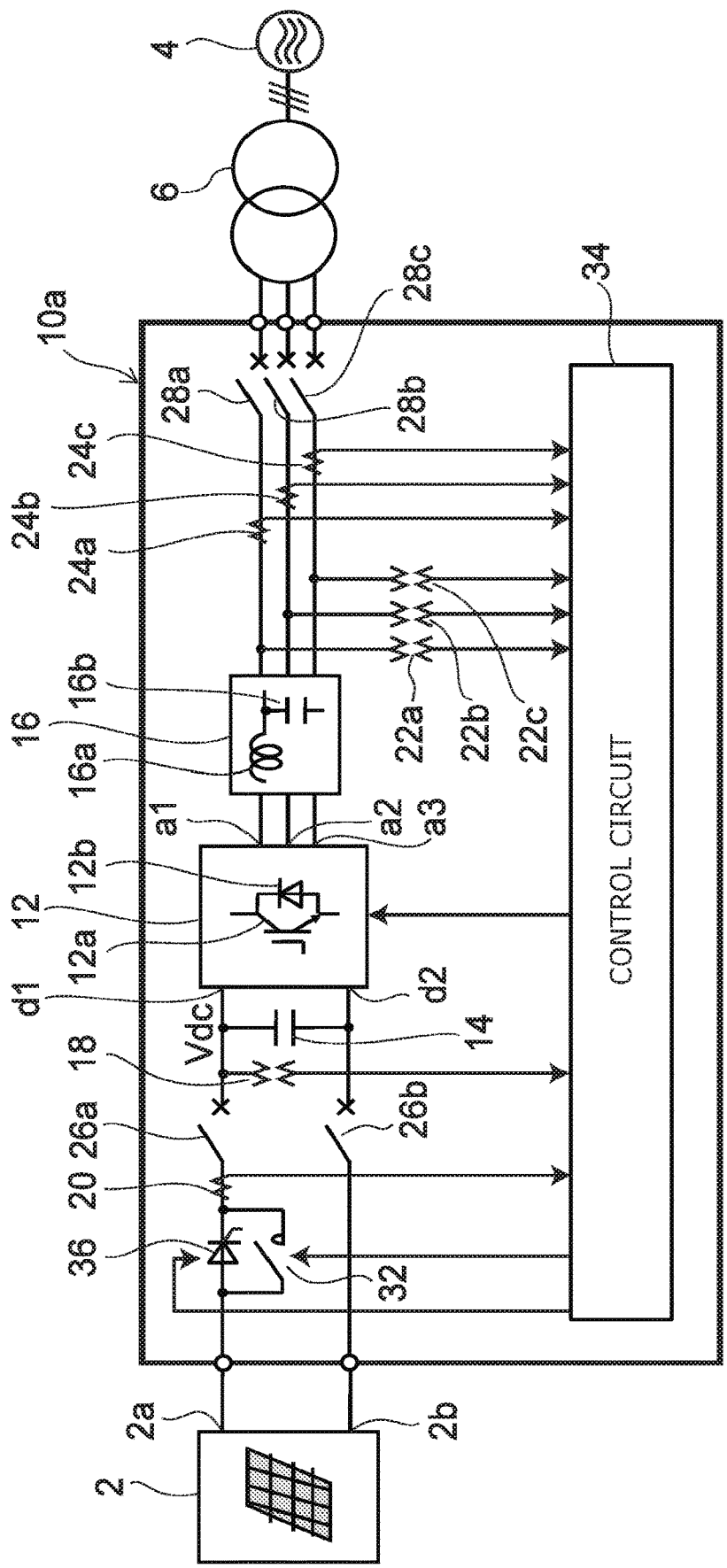
FIG. 5 is a block diagram schematically illustrating a modification of the power conversion device according to the embodiment.

FIG. 5 is a block diagram schematically illustrating a modification of the power conversion device according to the embodiment.

As illustrated in FIG. 5, in a power conversion device 10a of the example, the diode 30 is replaced with a thyristor 36. The other parts are substantially the same as those of the power conversion device 10 described in reference to FIG. 1; therefore, the other parts are marked with the same reference numerals; and a detailed description is omitted.

The gate terminal of the thyristor 36 is connected to the control circuit 34. The control circuit 34 controls the ON/OFF of the thyristor 36.

In the power conversion device 10a as well, substantially the same operation as the power conversion device 10 can be performed. The reverse flow of the electrical power into the solar cell panel 2 can be suppressed by the thyristor 36. Also, because a switch-ON control is possible in the thyristor 36, for example, the controllability during maintenance, etc., can be increased. The gate of the thyristor 36 may be supplied constantly other than during maintenance to set the thyristor 36 to a conductable state other than during maintenance; or the gate of the thyristor 36 may be supplied to set the thyristor 36 to the conductable state only in the SVC operation mode.

Thus, the rectifying element that suppresses the reverse flow of the electrical power into the solar cell panel 2 may be the diode 30 or may be the thyristor 36. The rectifying element may be any element capable of supplying the direct current power from the solar cell panel 2 to the power converter 12 and capable of suppressing the reverse flow of the electrical power into the solar cell panel 2.

Hereinabove, embodiments of the invention are described with reference to specific examples. However, the embodiments of the invention are not limited to these specific examples. For example, one skilled in the art may similarly practice the invention by appropriately selecting specific configurations of components included in the power conversion device such as the power converter, the direct current capacitor, the voltage sensor, the rectifying element, the electromagnetic contactor, the control circuit, etc., from known art; and such practice is within the scope of the invention to the extent that similar effects can be obtained.

Also, any two or more components of the specific examples may be combined within the extent of technical feasibility and are within the scope of the invention to the extent that the spirit of the invention is included.

Further, all power conversion devices and methods for operating power conversion devices practicable by an appropriate design modification by one skilled in the art based on the power conversion device and the method for operating the power conversion device described above as the embodiments of the invention also are within the scope of the invention to the extent that the spirit of the invention is included.

Further, various modifications and alterations within the spirit of the invention will be readily apparent to those skilled in the art; and all such modifications and alterations should be seen as being within the scope of the invention.

Although several embodiments of the invention are described, these embodiments are presented as examples and are not intended to limit the scope of the invention. These novel embodiments may be carried out in other various forms; and various omissions, substitutions, and modifications can be performed without departing from the spirit of the invention. Such embodiments and their modifications are within the scope and spirit of the invention and are included in the invention described in the claims and their equivalents.

The invention claimed is:

1. A power conversion device, comprising:
 a power converter including a pair of direct current terminals and a plurality of alternating current terminals, the pair of direct current terminals being connected to a direct current power supply, the plurality of alternating current terminals being connected to an electric power system of alternating current, the power converter converting direct current power input from the direct current power supply into alternating current power and supplying the alternating current power to the electric power system;

a direct current capacitor connected between the pair of direct current terminals;

a voltage sensor detecting a voltage value of the direct current capacitor;

a rectifying element provided between the direct current capacitor and the direct current power supply, the rectifying element suppressing a reverse flow of electrical power from the power converter and the direct current capacitor into the direct current power supply;

an electromagnetic contactor connected in parallel with the rectifying element; and a control circuit controlling operations of the power converter and the electromagnetic contactor, in a case where the voltage value of the direct current capacitor detected by the voltage sensor is a prescribed value or more, the control circuit engages the electromagnetic contactor and supplies active power from the power converter to the electric power system, and in a case where the voltage value of the direct current capacitor detected by the voltage sensor is less than the prescribed value, the control circuit opens the electromagnetic contactor and supplies reactive power from the power converter to the electric power system.

2. The power conversion device according to claim 1, wherein when performing the supply of the active power and in the case where the voltage value of the direct current capacitor becomes less than the prescribed value, the control circuit opens the electromagnetic contactor and starts an operation of supplying the reactive power, and when performing the supply of the reactive power and in the case where the voltage value of the direct current capacitor becomes a second determination value or more, the control circuit engages the electromagnetic contactor and starts an operation of supplying the active power, the second determination value being higher than the prescribed value.

3. The power conversion device according to claim 1, wherein the rectifying element is a diode.

4. The power conversion device according to claim 1, wherein the rectifying element is a thyristor, and the control circuit controls an ON/OFF of the thyristor.

5. A method for operating a power conversion device, the power conversion device including:

a power converter including a pair of direct current terminals and a plurality of alternating current terminals, the pair of direct current terminals being connected to a direct current power supply, the plurality of alternating current terminals being connected to an electric power system of alternating current, the power converter converting direct current power input from the direct current power supply into alternating current power and supplying the alternating current power to the electric power system;

a direct current capacitor connected between the pair of direct current terminals;

a voltage sensor detecting a voltage value of the direct current capacitor;

a rectifying element provided between the direct current capacitor and the direct current power supply, the rectifying element suppressing a reverse flow of electrical power from the power converter and the direct current capacitor into the direct current power supply;

an electromagnetic contactor connected in parallel with the rectifying element; and a control circuit controlling operations of the power converter and the electromagnetic contactor, the method for operating the power conversion device comprising:

engaging the electromagnetic contactor and supplying active power from the power converter to the electric power system in a case where the voltage value of the direct current capacitor detected by the voltage sensor is a prescribed value or more; and opening the electromagnetic contactor and supplying reactive power from the power converter to the electric power system in a case where the voltage value of the direct current capacitor detected by the voltage sensor is less than the prescribed value.

* * * * *